US009671020B2

(12) United States Patent
Gebert et al.

(10) Patent No.: US 9,671,020 B2
(45) Date of Patent: Jun. 6, 2017

(54) CONCENTRIC SLAVE CYLINDER FOR A HYDRAULIC CLUTCH ACTUATOR

(71) Applicant: FTE automotive GmbH, Ebern (DE)

(72) Inventors: Stefan Gebert, Sonnefeld (DE); Matthias Lehnert, Bamberg (DE); Ruthard Braun, Stadtlauringen (DE); Elmar Kuhn, Pfarrweisach (DE); Ernst Möller, Oberesfeld (DE); Jan Gnyp, Ebern (DE)

(73) Assignee: FTE automotive GmbH, Ebern (DE)

( * ) Notice: Subject to any disclaimer, the term of this patent is extended or adjusted under 35 U.S.C. 154(b) by 441 days.

(21) Appl. No.: 14/365,752

(22) PCT Filed: Dec. 11, 2012

(86) PCT No.: PCT/EP2012/005110
§ 371 (c)(1),
(2) Date: Jun. 16, 2014

(87) PCT Pub. No.: WO2013/087192
PCT Pub. Date: Jun. 20, 2013

(65) Prior Publication Data
US 2015/0007715 A1 Jan. 8, 2015

(30) Foreign Application Priority Data

Dec. 17, 2011 (DE) .................. 20 2011 109 244

(51) Int. Cl.
*F16D 25/00* (2006.01)
*F16J 10/02* (2006.01)
*F16D 25/08* (2006.01)

(52) U.S. Cl.
CPC ............ *F16J 10/02* (2013.01); *F16D 25/083* (2013.01)

(58) Field of Classification Search
CPC .......... F16J 10/02; F16J 10/04; F16D 25/083; F16D 25/082; F16D 25/085; F16D 25/086
(Continued)

(56) References Cited

U.S. PATENT DOCUMENTS 3,955,660 A    5/1976   Poon et al.
4,915,202 A * 4/1990   Leigh-Monstevens   F16D 25/087
                                                                                              192/110 B (Continued)

FOREIGN PATENT DOCUMENTS

DE         103 23 570 A1    1/2004
DE   10 2008 006 202 A1    7/2009

OTHER PUBLICATIONS

Chinese Office Action, Patent Application Serial No. 201280062053.5, Applicant: FTE Automotive GmbH, Filing Date: Dec. 11, 2012, Mailing Date: Nov. 4, 2015, 10 pages.

(Continued)

*Primary Examiner* — Michael Leslie
*Assistant Examiner* — Dustin T Nguyen
(74) *Attorney, Agent, or Firm* — Reising Ethington, P.C.

(57) ABSTRACT

A central release unit for a hydraulic clutch actuator has a plastic cylinder housing which is produced by injection molding and which has at least one cylinder wall provided, on an outer circumference, with a reinforcement sleeve. The reinforcement sleeve can be fastened to the cylinder wall after the injection molding of the cylinder housing, for which purpose a snap-action connection is provided on a forward end, which faces away from the pressure connection piece, of the reinforcement sleeve. The connection is formed by a radially inwardly bent detent portion of the reinforcement sleeve and by a rib integrally formed on the outer circumference of the cylinder wall. The reinforcement (Continued)

sleeve has a main portion which adjoins the detent portion and which is of conical shape complementary to an outer circumferential surface, which is of conical form in the reinforcement region, of the cylinder wall.

20 Claims, 2 Drawing Sheets

(58) Field of Classification Search
USPC .............. 192/85.51; 92/169.2, 169.4, 171.1
See application file for complete search history.

(56) References Cited

U.S. PATENT DOCUMENTS

| | | | |
|---|---|---|---|
| 4,938,332 A * | 7/1990 | Thomas | F16D 25/087 192/85.51 |
| 5,458,224 A * | 10/1995 | Takano | F16D 25/087 192/85.51 |
| 6,244,409 B1 * | 6/2001 | Winkelmann | F16D 25/083 192/85.51 |
| 6,422,370 B1 * | 7/2002 | Thomire | F16D 25/082 192/85.51 |
| 7,231,845 B2 | 6/2007 | Klaricic | |
| 8,292,055 B2 | 10/2012 | Wilton et al. | |
| 2006/0133943 A1 * | 6/2006 | Nommensen | F04B 39/122 417/415 |

OTHER PUBLICATIONS

PCT Search Report and Written Opinion, International Application No. PCT/EP2012005110, Mailing Date Mar. 13, 2013 plus Written Opinion—English Translation, 21 pages.
German Search Report, Application No. 20 2011 109 244.9, Mailing Date: Jan. 30, 2012, 5 pages.

* cited by examiner

CONCENTRIC SLAVE CYLINDER FOR A HYDRAULIC CLUTCH ACTUATOR

TECHNICAL FIELD

The present invention relates to a concentric slave cylinder for a hydraulic clutch actuator. In particular, the invention relates to a concentric slave cylinder of hydraulic clutch actuator for a motor vehicle friction clutch such as in widespread use in the automobile industry.

PRIOR ART

A conventional hydraulic clutch actuator for motor vehicles has a master cylinder which is connected with a compensating reservoir filled with hydraulic fluid and which can be actuated by way of, for example, a clutch pedal. The master cylinder is hydraulically connected by way of a pressure line with a slave cylinder so that the pressure generated in the master cylinder by pressing down the clutch pedal is transmissible via the fluid column in the pressure line to the slave cylinder. As a result, the release bearing of the friction clutch is acted on by an actuating force from the slave cylinder in order to separate, by way of a release mechanism, the clutch pressure plate from the clutch drive plate and thus the engine from the transmission of the motor vehicle.

In order to ensure uniform actuation of the friction clutch with a smallest possible need for space of the slave cylinder it has been long known to construct the slave cylinder as an annular cylinder which is arranged around the clutch shaft or transmission shaft and preferably fixed to the transmission housing. An annular piston is arranged in the annular cylinder to be displaceable in the axial direction of the clutch shaft or transmission shaft and is operatively connected with the release bearing of the friction clutch. When hydraulic loading of the annular cylinder by way of the pressure line takes place the annular piston acts by way of the release bearing on the release lever to release the friction clutch. Slave cylinders of the annular kind are, as a consequence of their concentric arrangement with respect to the clutch shaft or transmission shaft, also termed concentric slave cylinder.

Modern concentric slave cylinders have a cylinder housing, which for reasons of cost and weight are predominantly made of plastics material. At least one outer circumferential wall of the cylinder housing radially outwardly bounds an annular pressure chamber in which the annular piston operatively connected with a clutch is slidably received. The cylinder housing made of plastics material optionally also has an inner cylinder wall which radially inwardly bounds the pressure chamber and guides the annular piston. Alternatively, a guide sleeve predominantly deep-drawn from steel plate is arranged concentrically within the cylinder wall and fixed to the cylinder housing in order to radially inwardly bound the pressure chamber and guide the annular piston. The cylinder housing additionally has a pressure connection which communicates with the pressure chamber and by way of which the pressure chamber can be selectively loaded with the pressure medium in order to release the clutch.

The common choice for cost-favorable production of cylinder housings for hydraulic clutch actuators in large batch numbers is injection-molding from plastic. As known, the respective plastics material is melted in an injection unit of an injection-molding machine and injected into a two-part or multi-part injection-molding tool in which the plastics material solidifies again before the injection-molded part is removed by or after opening of the injection-molding tool. The hollow space i.e. the cavity of the injection-molding tool determines the shape and the surface structure of the finished part. In the specific case of the concentric slave cylinder housing, the pressure connection is formed, in particular, by use of a mold core which is placed in the injection-molding tool and around which the plastics material flows during the injection-molding process. In that situation, it is known that a load-bearing structure of the plastics material is not always created in the flow direction of the molten plastics material behind the mold core so that there is a risk that the cylinder housing during pressure loading of the pressure chamber cracks in the region of the outer cylinder wall and creates a leakage there. It is desired to eliminate this risk.

There can be inferred from DE 199 51 414 A1 (see, in particular, FIG. 2 and the associated description in column 5, lines 59 to 67) which is hereby incorporated by reference an injection-molded plastic cylinder housing, of a concentric slave cylinder which is provided with a reinforcement (reference numeral 21) for stiffening of the outer cylinder wall of the cylinder housing In operation of the concentric slave cylinder, i.e. when the pressure chamber is subject to pressure loading, the reinforcement prevents radial expansion of the outer cylinder wall. In particular, the reinforcement is made from a sheet metal sleeve which is produced without cutting and which can be mechanically positively secured to the cylinder housing by pressing or shrinking onto the circumferential surface of the outer cylinder wall. However, the very region mentioned above—which is critical and in which the structure of the plastics material may have an insufficient load-bearing capability as a consequence of the injection-molding process—is additionally subject to external mechanical loading so that such a reinforcement does not appear suitable for avoidance of the mentioned risk of leakage.

Moreover, cylinder housings, which are injection-molded from plastics material, for concentric slave cylinders are known from the prior art in which during the injection-molding process an optionally sleeve-shaped reinforcement is injection-molded around or on particularly in the region of the cylinder wall (see WO 90/04116 A1, FIGS. 2, 4, 5 and 10: reference numeral 56; DE 103 23 570 A1, FIG. 3: reference numeral 19; DE 10 2008 006 202 A1, FIGS. 1 and 3: reference numeral 17). However, on the one hand this complicates the injection-molding tool and the actual injection-molding process, because the reinforcement is merely placed in the injection-molding tool, which is of more complicated design with respect to the injection channel duct and ventilation channels, and has to be held there with appropriate orientation. On the other hand, this causes comparatively lengthy dwell times, which are undesired in mass production, of the injection molded workpiece in the injection molding mold, since the plastics material in the injection-molding mold can cool down and harden less rapidly due to the heat storage capacity of the metal reinforcement.

Finally, concentric slave cylinders are known from the specifications DE 43 31 728 A1 (FIG. 3) and DE 689 16 250 T2 (FIG. 1), in which the plastic cylinder housing is reinforced by steel bands of hollow-cylindrical shape in order to counteract deformation of the cylinder housing. In the last-mentioned specification it is described that each of these bands after mounting at ambient temperature preferably bear with a precise fit or with a light press seat against the respective cylindrical surface of the cylinder housing. In that case one or more tines can be bent out of the plane of the respective band in order to exert a clamping action on the housing surface, whereby unintentional slipping of the bands off the cylinder housing is prevented.

A disadvantage of this prior art is seen in the fact that due to production tolerances a precise seat or a press seat of the steel bands might not happen, so that the cylinder housing under pressure loading of the annular chamber in the cylinder housing can expand radially outwardly in undesired manner. Conversely, in the case of a too 'narrow' tolerancing of the steel bands very high forces for mounting the steel bands may have to be applied, accompanied by a high level of surface pressure against a cylinder housing, which can lead to undesired radially inward deformation of the cylinder housing and thus similarly to deformation of the annular chamber. In both cases ('too wide' or 'too narrow' steel bands), apart from possible damage of the cylinder housing, sealing problems at the annular piston received in the annular chamber can also arise.

What is desired is a hydraulic clutch actuator that has a concentric slave cylinder with a cylinder housing, which is injection-molded from plastics material and can be produced simply and economically as possible and which is capable of reliably withstanding the hydraulic forces arising in operation.

SUMMARY OF THE INVENTION

According to one aspect or the invention, a concentric slave cylinder for a hydraulic clutch actuator has a cylinder housing which is injection-molded from a plastics material and which has at the outer circumferential side at least one cylinder wall provided with a reinforcing sleeve. The wall with the reinforcing sleeve radially outwardly bounds an annular pressure chamber in which an annular piston operatively connectible with the clutch is slidably received. The piston is selectively loadable by a pressure medium via a pressure connecting stub pipe of the cylinder housing communicating with the pressure chamber, in order to release the clutch. The reinforcing sleeve after injection-molding of the cylinder housing is attachable to the cylinder wall by a snap connection, which is provided at a front end of the reinforcing sleeve remote from the pressure connecting stub pipe. The reinforcing sleeve is radially inwardly deformed to form a detent section which together with a rib formed at the outer circumference of the cylinder wall forms the snap connection. The reinforcing sleeve has a main section which connects with its detent section and which is conically shaped to be complementary with an outer circumferential surface, which is conically shaped in the reinforcing region, of the cylinder wall.

In the preferred embodiment, the reinforcing sleeve is neither pressed or shrunk onto the outer cylinder wall with a frictional couple nor is it placed in the injection-molding mold and injected around or in place during the injection-molding process, so that the disadvantages, which were referred with respect to the prior art, do not arise with the concentric slave cylinder according to the invention. The reinforcing sleeve after removal of the solidified cylinder housing from the injection-molding tool is simply pushed onto the cylinder wall of the cylinder housing and fastened by means of the snap connection, which is constructed on the side of the reinforcing sleeve remote from the problem region described in the introduction. During pushing of the reinforcing sleeve onto the cylinder wall the detenting section of the reinforcing sleeve detents with the integrally formed rib of the cylinder wall. At the same time the inner wall surface of the main section of the reinforcing sleeve bears with mechanically positive couple against the outer circumferential surface of the cylinder wall without creation of appreciable surface pressure. The reinforcing sleeve can thus be mounted on the cylinder housing with a defined, small bias by simple force/travel control during the mounting process. As a result, on the one hand a comparatively short occupation time of the injection-molding mold and on the other hand a load-bearing structure of the plastics material in the reinforced region of the cylinder housing are achieved, together with a stiffening effect by the reinforcing sleeve, which is already present from the start, i.e. even in the case of low pressures in the pressure chamber.

A further advantage of the conical form of the main section of the reinforcing sleeve consists in that the reinforcing sleeve has—by comparison with a cylindrical shape—a higher degree of stability of shape, which may be suitable for compensation for or correction of non-circularities of the cylinder housing as a consequence of production.

In a preferred form of embodiment of the concentric slave cylinder the detent section of the reinforcing sleeve is formed to be conically encircling, wherein the cone angle of the detent section with a center axis of the concentric slave cylinder is greater than that of the main section of the reinforcing sleeve. With respect to the dimensioning of the cone angle of the main section of the reinforcing sleeve it is moreover to be noted that here there has to be a compromise which takes into consideration that a greater cone angle gives rise to smaller axial travel of the reinforcing sleeve relative to the cylinder housing during mounting of the reinforcing sleeve, whereagainst a smaller cone angle gives rise to greater axial travel. If the cone angle is too steep there is the risk—within the scope of predetermined dimensioning, shape and positional tolerances—of excessive loading of the cylinder housing, as well as high mounting forces; however, if the cone angle is too flat, there is a risk of the reinforcing sleeve having a seat on the cylinder housing which too loose radially and thus has insufficient stiffening effect.

For preference, the reinforcing sleeve starting from a front edge of the reinforcing sleeve remote from the pressure connecting stub pipe is provided with cut-outs which divide the conical detent section into several sub-regions, which are resiliently flexible during detenting of the snap connection. In this regard, the cut-outs can advantageously reach as far as the main section of the reinforcing sleeve. It is advantageous for achieving uniform spring effects at the sub-regions if spacings of equal size are present between the cut-outs in circumferential direction of the reinforcing sleeve. The cut-outs also make possible engagement of a tool for pushing of the reinforcing sleeve onto the outer circumferential surface of the cylinder wall.

The reinforcing sleeve is preferably deep-drawn from a flat metal sheet. It is also achieved in simple manner by the deep-drawing process that the reinforcing sleeve is provided at a rear end facing the pressure connecting stub pipe with an encircling radiused portion steplessly connecting with the inner circumferential surface of the reinforcing sleeve. The radiused portion arises when the flat metal sheet is drawn by the deep-drawing die over the drawing ring. The radiused portion facilitates pushing of the reinforcing sleeve onto the cylinder wall of the cylinder housing.

BRIEF DESCRIPTION OF THE DRAWINGS

The invention is explained in more detail in the following on the basis of a preferred embodiment with reference to the accompanying drawings, in which.

DETAILED DESCRIPTION OF THE EMBODIMENT

Figure 1:
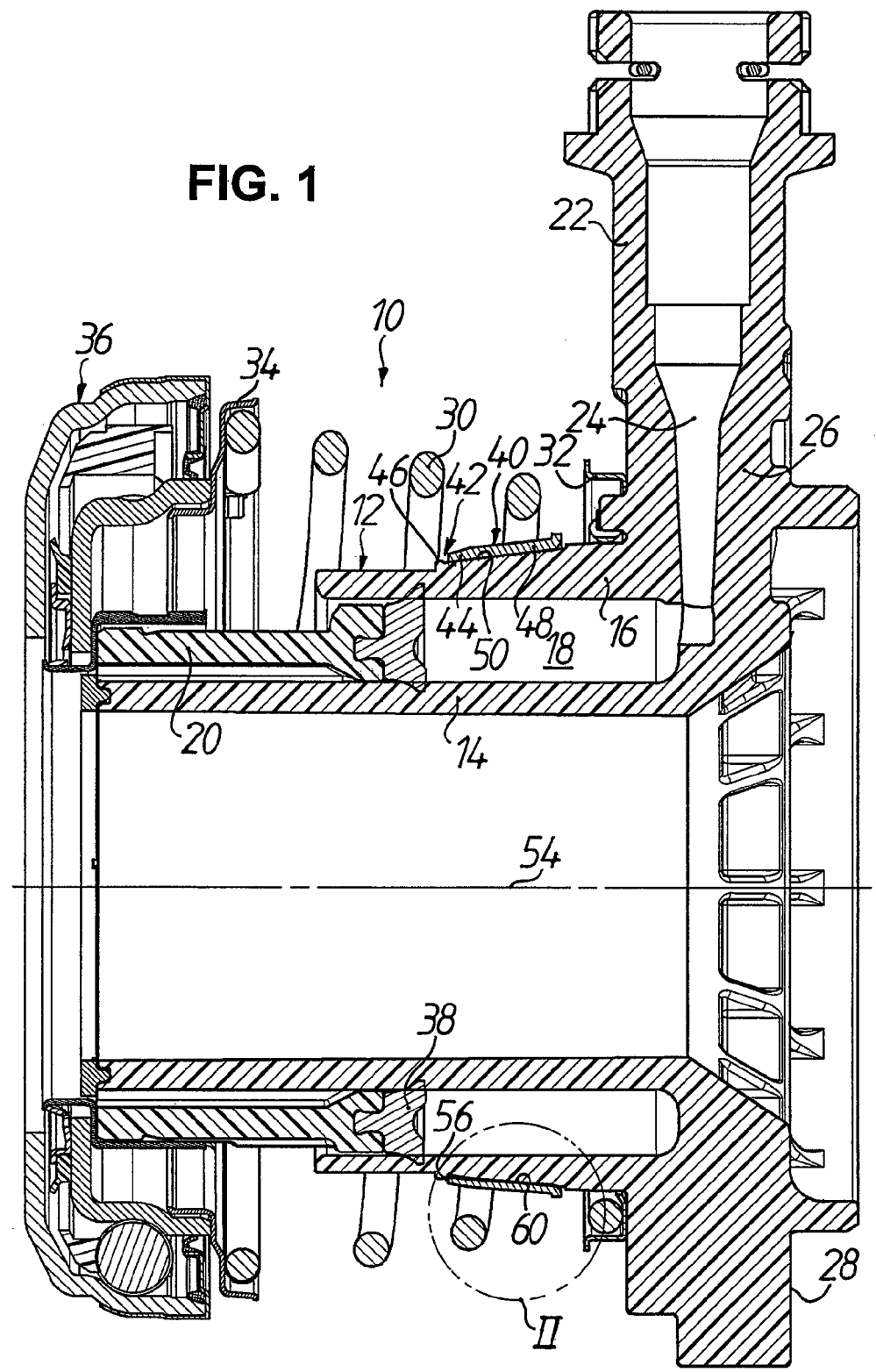
FIG. 1 shows a longitudinal sectional view of the concentric slave cylinder in accordance with one embodiment of the invention.
Figure 2:
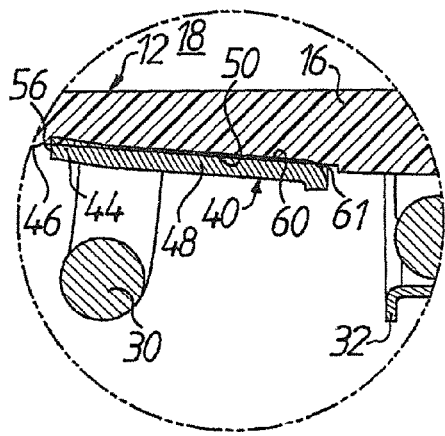
FIG. 2 shows a detail, to enlarged scale, of the concentric slave cylinder in correspondence with the detail circle II in FIG. 1.

A concentric slave cylinder 10 for a hydraulic clutch actuator for dry friction clutches is illustrated in FIG. 1 in basic setting in a non-mounted state. The concentric slave cylinder 10 has a cylinder housing 12, which is injection-molded from plastics material, for example from GF-filled polyphtalamide, with two concentrically arranged cylinder walls, namely an inner cylinder wall 14 and an outer cylinder wall 16, which bound an annular pressure chamber 18. An annular piston 20 operatively connectible with the clutch (not illustrated) is received in the pressure chamber 18 to be slidably displaceable and can be selectively acted on by a pressure medium via a pressure connecting stub pipe 22 of the cylinder housing 12 in order to release the dry friction clutch by displacement of the annular piston 12. The pressure connecting stub pipe 22 is for this purpose connected with the pressure chamber 18 by way of a channel 14 formed in the cylinder housing 12 so that the pressure medium, namely hydraulic fluid, can be fed to the pressure chamber 18 via the channel 24.

The cylinder walls 14 and 16 arranged concentrically with respect to one another are connected together at their end, which is illustrated on the right in FIG. 1, by way of a flange section 26. The flange section 26 is provided at the outer circumferential side with a plurality of angularly spaced-apart fastening eyes (not illustrated) which serve in the motor vehicle in a manner known per se for securing the concentric slave cylinder 10 to a transmission wall or a transmission cover (not illustrated) by means of, for example, screws (not illustrated), which pass through the fastening eyes and draw the concentric slave cylinder 10 by an end face 28 of the cylinder housing 12 against the transmission wall or transmission cover. The cylinder housing 12 together with the pressure connecting stub pipe 22 adjoining the flange section 26, its side walls 14 and 16 and the flange section 26, which connects these and has the fastening eyes, is preferably integrally injection-molded from plastics material.

The outer cylinder wall 16 is surrounded by a biasing spring 30, in the illustrated embodiment a conically widening helical compression spring, which is supported at its end on the right in FIG. 1 by way of an annular sheet-metal part 32 at the flange section 26 of the cylinder housing 12 and on its side at the left in FIG. 1 exerts, by way of a spring plate 34 deep-drawn from a metal plate, a defined biasing force on a release bearing 36, which is known per se. The release bearing 36 is secured in suitable manner at the end of the annular piston 21 on the left in FIG. 1 so that the release bearing 36 when the annular pressure chamber 18 is loaded with pressure is displaceable in an axial direction, i.e. horizontal direction in FIG. 1, in order to disengage or engage the dry friction clutch in a manner known per se.

A dynamic seal in the form of an elastomeric sealing sleeve 38 is mounted in suitable manner on the end, which is at the right in FIG. 1, of the piston 20, which in the illustrated basic setting still overlaps the outer cylinder wall 16 in the axial direction. The sealing sleeve 38, which for simplification of the illustrated is here shown in undeformed state, bears not only against the inner cylinder wall 14 of the cylinder housing 12, but also against the outer cylinder wall 16 of the cylinder housing 12 so as to seal off the pressure chamber 18 on the left with respect to FIG. 1.

The outer cylinder wall 16 is provided at its outer circumference with a reinforcing sleeve 40, which in the position shown in FIG. 1 is fastened to the parts belonging to the concentric slave cylinder 10 at the outer cylinder wall 16 by means of a snap connection 42, which is to be described in more detail in the following and which is provided at the end of the reinforcing sleeve 40 remote from the pressure connecting stub pipe 22. The reinforcing sleeve 40 is arranged approximately in the middle region of the outer cylinder wall 16, which is to be supported against the pressure in the pressure chamber 18 so as to avoid damaging structural changes to the plastics material.

The reinforcing sleeve 40, which is deep-drawn from a planar sheet metal, is subjected at its front end remote from the pressure connecting stub pipe 22 to encircling, radially inward deformation to form a conical detent section 44. This detent section 44 forms together with a rib 46, which is integrally formed to encircle at the outer circumference of the outer cylinder wall 16, the snap connection 42.

Figure 5:
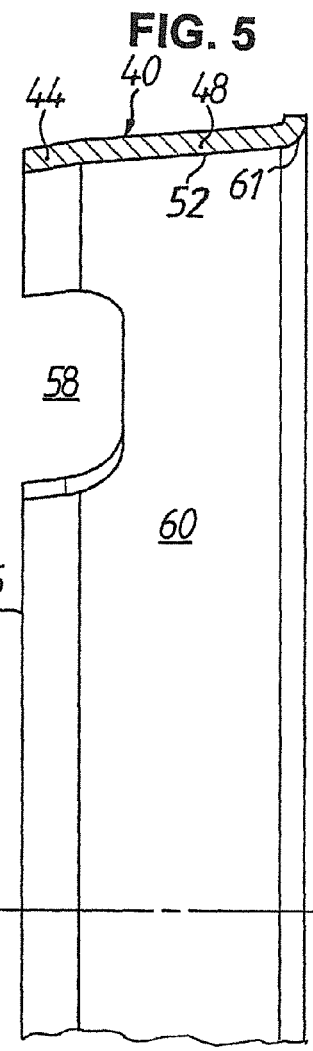
FIG. 4 shows a side view of the reinforcing sleeve and FIG. 5 shows a broken-away section through the reinforcing sleeve.
Figure 3:
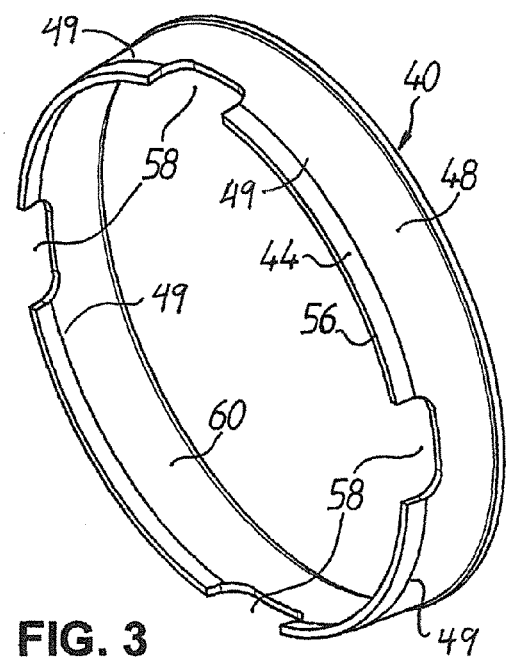
FIG. 3 shows a perspective view of the reinforcing sleeve shown in FIG. 1.
Figure 4:
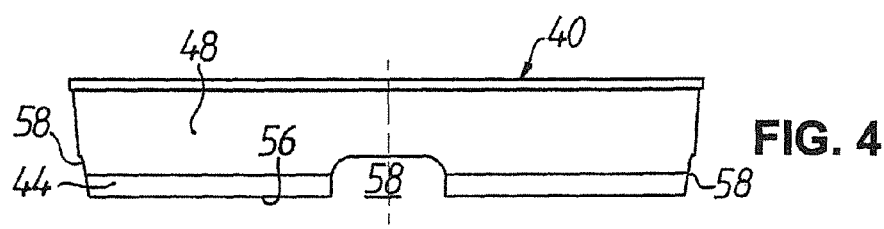

As best evident from FIGS. 3 to 5 the reinforcing sleeve 40 has a similarly conically shaped main section 48 adjoining its conical detent section 44. This main section 48 is conically shaped to be complementary to the outer circumferential surface 50, which is similarly conically formed in the reinforcing region, of the outer cylinder wall 16 so that when the reinforcing sleeve 40 is pushed onto the outer cylinder wall 16 a mechanically positive couple which is free of radial play, but virtually free of pressure, arises between the inner circumferential surface 52 of the reinforcing sleeve 40 and the conical outer circumferential surface 50 of the outer cylinder wall 16. The cone angle of the detent section 44 with the center axis 54 of the concentric slave cylinder 10 is, due to the radially inwardly deformation of the detent section 44, greater than the cone angle of the main section 48 with respect to the center axis 54 of the concentric slave cylinder.

The reinforcing sleeve 40, starting from its front edge 56 remote from the pressure connecting stub pipe 22, is provided with cut-outs 58, of which four cut-outs 58 are provided in the shown embodiment, but even more can be provided, between which spacings of equal size are present as seen in the circumferential direction of the reinforcing sleeve 40. The cut-outs 58 divide the detent section 44 of the reinforcing sleeve 40 into four sub-regions 49, which are sufficiently resiliently yielding for detenting of the step connection 42. The cut-outs 58 are formed to extend into the main section 48 of the reinforcing sleeve 40, which is beneficial to the spring characteristics of the sub-regions present between the cut-outs 58. When the reinforcing sleeve 40 is pushed onto the outer circumferential surface 50 of the outer cylinder wall 16 the cut-outs 58 serve for engagement of a tool (not illustrated).

In order to ensure an easy or smooth capability of pushing the reinforcing sleeve 40 onto the conical outer circumferential surface 50 of the outer cylinder wall 16 the reinforcing sleeve 40 is provided at its rear end, which faces the pressure connecting stub pipe 22, with an encircling radiused portion 61 steplessly connected with the inner circumferential surface 60 of the reinforcing sleeve 40, as is most clearly evident from FIG. 5. This radiused portion 61 arises during the deep-drawing process forming the reinforcing sleeve 40 and is not removed in the subsequent edge trimming of the reinforcing sleeve 40.

A concentric slave cylinder for a hydraulic clutch actuator has a cylinder housing which is injection-molded from a plastics material and which has at the outer circumferential side at least one cylinder wall provided with a reinforcing sleeve, which wall radially outwardly bounds an annular pressure chamber in which an annular piston operatively connectible with the clutch is received to be displaceable, the piston being selectively loadable by a pressure medium via a pressure connecting stub pipe, which communicates with the pressure chamber, in order to release the clutch. After injection-molding of the cylinder housing the reinforcing sleeve is attachable to the cylinder wall, for which purpose a snap connection is provided at a front end of the reinforcing sleeve remote from the pressure connecting stub pipe. The snap connection is formed by a radially inwardly deformed detent section of the reinforcing sleeve and a rib integrally formed at the outer circumference of the cylinder wall. In that case, the reinforcing sleeve has a main section, which adjoins the detent section and which is conically shaped to be complementary to an outer circumferential surface of the cylinder wall formed to be conical in the reinforcing region.

Variations and modification are possible without departing from the scope and spirit of the present invention as defined by the appended claims.

The invention claimed is:

1. A concentric slave cylinder for a hydraulic clutch actuator having a cylinder housing which is injection-molded from a plastics and which has at least one cylinder wall, radially outwardly bounding an annular pressure chamber in which an annular piston operatively connectible with the clutch is received to be slidably displaceable, which annular piston, in order to release the clutch, can be selectively acted on by a pressure medium via a pressure connecting stub pipe of the cylinder housing, which communicates with the pressure chamber, characterized in that;
   a reinforcing sleeve being mounted at an outer circumferential side of the at least one cylinder wall after injection-molding of the cylinder housing and being attachable to the cylinder wall by a snap connection provided at a front edge of the reinforcing sleeve remote from the pressure connecting stub pipe,
   the reinforcing sleeve being deformed radially inwardly at the front edge to form a detent section which together with a rib formed at the outer circumference of the cylinder wall forms the snap connection,
   the reinforcing sleeve having a main section which adjoins its detent section and which is conically shaped to be complementary to an outer circumferential surface of the cylinder wall formed to be conical in the reinforcing region.

2. A concentric slave cylinder according to claim 1, characterized in that the detent section of the reinforcing sleeve is formed to be conically encircling, wherein the cone angle of the detent section with a center axis of the concentric slave cylinder is greater than that of the main section of the reinforcing sleeve.

3. A concentric slave cylinder according to claim 2, characterized in that the reinforcing sleeve starting from the front edge of the reinforcing sleeve remote from the pressure connecting stub pipe is provided with cut-outs dividing the conical detent section into a plurality of sub-regions which are resiliently yielding when detenting of the snap connection takes place.

4. A concentric slave cylinder according to claim 3, characterized in that the cut-outs extend into the main section of the reinforcing sleeve.

5. A concentric slave cylinder according to claim 4, characterized in that spacings of equal size are present between the cut-outs in the circumferential direction of the reinforcing sleeve.

6. A concentric slave cylinder according to claim 5, characterized in that the reinforcing sleeve is deep-drawn from planar sheet metal.

7. A concentric slave cylinder according to claim 6, characterized in that the reinforcing sleeve is provided at a rear end facing the pressure connecting stub pipe with a continuously radially outwardly curved portion steplessly connecting with an inner circumferential surface of the reinforcing sleeve.

8. A concentric slave cylinder according to claim 4, characterized in that the reinforcing sleeve is provided at a rear end facing the pressure connecting stub pipe with a continuously radially outwardly curved portion steplessly connecting with an inner circumferential surface of the reinforcing sleeve.

9. A concentric slave cylinder according to claim 4, characterized in that the reinforcing sleeve is deep-drawn from planar sheet metal.

10. A concentric slave cylinder according to claim 9, characterized in that the reinforcing sleeve is provided at a rear end facing the pressure connecting stub pipe with a continuously radially outwardly curved portion steplessly connecting with an inner circumferential surface of the reinforcing sleeve.

11. A concentric slave cylinder according to claim 3, characterized in that spacings of equal size are present between the cut-outs in the circumferential direction of the reinforcing sleeve.

12. A concentric slave cylinder according to claim 11, characterized in that the reinforcing sleeve is deep-drawn from planar sheet metal.

13. A concentric slave cylinder according to claim 12, characterized in that the reinforcing sleeve is provided at a rear end facing the pressure connecting stub pipe with a continuously radially outwardly curved portion steplessly connecting with an inner circumferential surface of the reinforcing sleeve.

14. A concentric slave cylinder according to claim 3, characterized in that the reinforcing sleeve is provided at a rear end facing the pressure connecting stub pipe with a continuously radially outwardly curved portion steplessly connecting with an inner circumferential surface of the reinforcing sleeve.

15. A concentric slave cylinder according to claim 2, characterized in that the reinforcing sleeve is deep-drawn from planar sheet metal.

16. A concentric slave cylinder according to claim 15, characterized in that the reinforcing sleeve is provided at a rear end facing the pressure connecting stub pipe with a continuously radially outwardly curved portion steplessly connecting with an inner circumferential surface of the reinforcing sleeve.

17. A concentric slave cylinder according to claim 2, characterized in that the reinforcing sleeve is provided at a rear end facing the pressure connecting stub pipe with a continuously radially outwardly curved portion steplessly connecting with an inner circumferential surface of the reinforcing sleeve.

18. A concentric slave cylinder according to claim 1, characterized in that the reinforcing sleeve is deep-drawn from planar sheet metal.

19. A concentric slave cylinder according to claim 18, characterized in that the reinforcing sleeve is provided at a rear end facing the pressure connecting stub pipe with a continuously radially outwardly curved portion steplessly connecting with an inner circumferential surface of the reinforcing sleeve.

20. A concentric slave cylinder according to claim 1, characterized in that the reinforcing sleeve is provided at a rear end facing the pressure connecting stub pipe with a continuously radially outwardly curved portion steplessly connecting with an inner circumferential surface of the reinforcing sleeve.

\* \* \* \* \*